(12) United States Patent
Zhang et al.

(10) Patent No.: US 8,653,947 B2
(45) Date of Patent: Feb. 18, 2014

(54) RADIO FREQUENCY IDENTIFICATION SYSTEM AND TAG COUNTING ENDING METHOD FOR ANTI-COLLISION THEREOF

(75) Inventors: Yongzhi Zhang, Shenzhen (CN); Li Wang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 272 days.

(21) Appl. No.: 13/258,361

(22) PCT Filed: Dec. 28, 2009

(86) PCT No.: PCT/CN2009/076148
§ 371 (c)(1),
(2), (4) Date: Dec. 7, 2011

(87) PCT Pub. No.: WO2010/142126
PCT Pub. Date: Dec. 16, 2010

(65) Prior Publication Data
US 2012/0092136 A1   Apr. 19, 2012

(30) Foreign Application Priority Data

Jun. 10, 2009   (CN) .......................... 2009 1 0108043

(51) Int. Cl.
*H04Q 5/22*   (2006.01)
(52) U.S. Cl.
USPC ... 340/10.2; 340/10.1; 340/572.1; 340/572.4; 340/572.7
(58) Field of Classification Search
USPC ............... 340/10.2, 10.1, 572.1, 572.4, 572.7
See application file for complete search history.

(56) References Cited

U.S. PATENT DOCUMENTS

| | | | |
|---|---|---|---|
| 7,009,526 B2 * | 3/2006 | Hughes et al. | ................. 340/8.1 |
| 7,612,672 B2 | 11/2009 | Choi et al. | |
| 2002/0180587 A1 * | 12/2002 | Stegmaier et al. | ........... 340/10.1 |
| 2008/0106383 A1 | 5/2008 | Choi et al. | |

FOREIGN PATENT DOCUMENTS

| | | |
|---|---|---|
| CN | 101136055 A | 3/2008 |
| CN | 101441698 A | 5/2009 |
| EP | 1914660 A1 | 4/2008 |
| KR | 100662050 B1 | 12/2006 |

OTHER PUBLICATIONS

International Search Report in international application No. PCT/CN2009/076148, mailed Mar. 25, 2010.
English Translation of the Written Opinion of the International Search Authority in international application No. PCT/CN2009/076148, mailed on Mar. 25, 2010.
RFID ISO/IEC 18000—6 (UHF) Type—B Anti-collision Algorithm and Its Implementation Jan. 31, 2008.

* cited by examiner

*Primary Examiner* — Tai T Nguyen
(74) *Attorney, Agent, or Firm* — Oppedahl Patent Law Firm LLC

(57) ABSTRACT

The present invention provides a radio frequency identification (RFID) system and a tag counting ending method for anti-collision thereof. The RFID system comprises a reader-writer and tags. The tag counting ending method comprises: in the counting process, when the reader-writer does not receive a response signal from a tag and the value of a register is not greater than a pre-determined counting ending register threshold value, the reader-writer transmits a Finish command to each of the tags and waits for responses; after receiving the Finish command, the tag determines whether the tag itself is counted successfully, if so, makes no response; if not, sets the counter of tag itself as 0 and transmits a response signal to the reader-writer; if the reader-writer receives the response signal, then determines that counting is not finished and continues to count the tag which makes response; if the reader-writer does not receive the response signal, then determines that counting is finished.

16 Claims, 4 Drawing Sheets

RADIO FREQUENCY IDENTIFICATION SYSTEM AND TAG COUNTING ENDING METHOD FOR ANTI-COLLISION THEREOF

TECHNICAL FIELD OF THE INVENTION

The present invention relates to the field of radio communications, in particular to a radio frequency identification system (RFID) and a tag counting ending method for anti-collision in such system.

BACKGROUND OF THE INVENTION

In practical applications of RFID, in many cases, a reader-writer in a radio frequency field is corresponding to a plurality of electronic tags. When a reader-writer counts a plurality of electronic tags at the same time, channel competition occurs, which causes collision, such that the electronic tags are unable to transmit information to the reader-writer correctly. Therefore, it is desirable to adopt a certain mechanism to avoid the collision or reduce the collision.

In the current RFID international standard ISO 18000-6, to solve the collision is problem, time slot ALOHA algorithm is employed for type A and type C, while a binary tree algorithm is employed for type B. Both the time slot ALOHA and the binary tree are based on time division multiple access mode.

The time slot ALOHA algorithm means that divide time into some discrete time slots, the tags are required to select one of the time slots randomly and transmit data at the border of the time slots. In the protocol of type A and type C of the ISO 18000-6, the process of implementing anti-collision by using the time slot ALOHA algorithm is: at the beginning of each counting process, the reader-writer notifies all tags of a range of selectable time slots, in which the tags randomly select a time slot for responding, the tags either transmit successfully or collide completely; if collision occurs, reselecting a time slot and retransmitting until all tags transmit successfully.

The basic concept of the binary tree algorithm is that: the tags in collision are split into two subsets 0 and 1 on the left and right respectively; subset 0 is inquired firstly, the tags are identified correctly if there is no collision; the tags in collision are split again if there is collision, the subset 0 is split into two subsets subset 00 and subset 01, and so on, until all tags in the subset 0 are identified; and then subset 1 is inquired according to the above steps. The binary tree algorithm is shown in FIG. 1. In the protocol of type B of the ISO 18000-6, the process of implementing anti-collision by using the binary tree algorithm is as follows: the reader-writer transmits a counting begin command to make all tags begin to respond; after the tags receive the commands, 0 or 1 are generated by a random number generator, in this way, the tags are divided into two subsets of which the random number is 0 and 1 respectively, which correspond to the binary tree and are called left branch (branch 0) and right branch (branch 1); the tags of which the random number is 0, namely the tags in the left branch, respond immediately, while for the tags of which the random number is 1, namely the tags in the right branch, set the value of a counter as 1 and can not perform splitting responding until waits to the end of the response of the left branch; if there is no collision and the response is successful, then the reader-writer transmits a command for acknowledgement and reduces the value of the tag counter by 1; if the tags collide, the reader-writer transmits a command to resplit the tags of which the counter value is 0, namely the tags in the left branch, and to add the counter value of tags of which the counter value is not zero, namely the tags in the right branch, by 1; and so forth, until all tags respond successfully.

From the description of the anti-collision process in protocol of type B of ISO 18000-6, it can be seen that, in the binary tree algorithm, binary splitting is performed at the left end of the tree, namely near the tags 0 each time, how to determine whether all tags in the communication field have been counted so as to finish the anti-collision process is not given in the standard. Currently, the generally used method is that, during counting, recording the possibly reachable maximum values of all the tag counters by using a register, the register is updated, each splitting, in case of no response or normal response, when the value of the register becomes 0, it is indicated that all tags in the communication field have been responded, and the counting process is finished. The specific steps are as shown in FIG. 1, comprising:

Step 101: at the beginning of counting, a reader-writer transmits a counting command to tags, and a register is set with an initial value.

Step 102: during counting, the reader-writer waits for response signals from the tags.

Step 103: if there is no response signal this time, then the reader-writer determines the value of the register, if the value of the register is less than or equal to 0, it means that counting is finished and then quit the counting flow; if the value of the register is greater than 0, then it means that counting is not finished, step 104 is to be executed to continue the counting process.

Step 104: the reader-writer determines a next command according to the response situation, and updates the value of the register according to the command; if the command transmitted by the reader-writer is a Fail command, the value of the register is added by 1; if the command transmitted by the reader-writer is a Success command, the value of the register is subtracted by 1; if the command transmitted by the reader-writer is another command, the value of the register is not adjusted.

Step 105: after the command is transmitted, returning to step 102 to continuing the counting process.

This algorithm makes a statistic to every change of a counter during the whole counting process which can theoretically ensure that all tags in the communication field are counted.

However, in practical applications, not all commands of the reader-writer can be received by a tag due to instability of the electromagnetic field, then there is a case in the tag that the counting commands are omitted or decoding error occurs, which causing that some tags may be omitted after the counting process is finished in practice. During the whole tag counting process, if a tag does not receive Success command of the reader-writer, then the value of tag counter will not be subtracted by 1, if the number of the omitted Success commands is relatively great, then the counters of some tags are still not set to 0 when the reader-writer finishes counting, such that these tags are not counted, resulting in tag omitting.

SUMMARY OF THE INVENTION

The technical issue to be solve by the present invention is to provide a radio frequency identification system, and also to provide a tag counting ending method for anti-collision in such a system, to solve the problem of tag counting omitting during the process of tag anti-collision in the radio frequency identification system, and to reduce tag counting omitting.

In order to solve the above-mentioned technical issue, the following solution is adopted by the present invention:

a tag counting ending method for anti-collision in a radio frequency identification system is provided, the method comprises:

transmitting a Finish command to each tag by a reader-writer and waiting for response when no response signal is received from tags and the value of a register is not greater than a pre-determined counting ending register threshold value;

judging whether a tag itself is counted successfully after the tag receives the Finish command, if so, making no response;

determining that counting is finished if the reader-writer does not receive a response signal.

the judging method is: if in ID status currently, then the tag determines that the tag itself is not counted successfully; if not in ID status currently, then the tag determines that the tag itself is counted successfully.

The method may further comprise:

setting a counter of a tag itself as 0 and transmitting a response signal to the reader-writer when the tag determines that the tag itself is not counted successfully.

After the tag receives a Finish command, the response signal is carrying an identity ID information of tag.

The method may further comprise:

the reader-writer receives the response signal, determines that counting is not finished, and continues to count the tag which makes response.

The counting ending register threshold value may be an initial value of the register minus 1.

A radio frequency identification system, comprises a reader-writer and tags; the reader-writer comprises a register, and the tags comprise counters, the reader-writer is used for, transmitting a Finish command to the tags and waiting for responses when no response signal is received from the tags and the value of the register is not greater than a pre-determined counting ending register threshold value, and determining that counting is finished in case that no response signal is received;

the tag is used for, judging whether the tag itself is counted successfully when receiving the Finish command, if so, making no response.

The tag may further be used for, converting current status from ID status to Data_Exchange status after the tag is counted successfully.

The tag may further be used for, setting a counter of the tag itself as 0 and transmitting a response signal to the reader-writer when the tag determines that the tag itself is not counted successfully.

The reader-writer may further be used for determining that counting is not finished when receiving a response signal and continuing to count the tag which makes response.

The number of the tags is more than two.

The present invention has the following beneficial effects:

comparing with the prior art, a mechanism is added by the present invention after the reader-writer finishes the counting, such that in the communication field, all tags that have not been counted can respond information to the reader-writer immediately to notify the reader-writer that there are still tags which are not counted, therefore tag omitting cases are reduced. The method is simple and easy to be implemented.

DETAILED DESCRIPTION OF THE INVENTION

The radio frequency identification system proposed by the present invention comprises a reader-writer and a plurality of tags, wherein the reader-writer is used for: at the beginning of counting, transmitting a counting command to each of the tags and setting an initial value of a register; during counting, waiting for responses from the tags, transmitting corresponding commands according to the responses from the tags when receiving the responses, meanwhile adjusting the value of the register (specifically, if there is no collision and the responses are successful, then transmitting Success commands to the tags and subtracting the value of the register by 1; if there is any collision or the responses are failed, then transmitting Fail commands to the tags and adding the value of the register by 1); when no response is received and the value of the register is not greater than a pre-determined counting ending register threshold value (namely, subtracts the initial value of the register by 1), transmitting Finish commands to each of the tags and waiting for responses; determining that counting is not finished and continuing to count the tags which make a response if a response signal is received; and determining that counting is finished if no response signal is received; and determining that counting is not finished and continuing the counting process, when no response is received and the value of the register is greater than the pre-determined counting ending register threshold value.

The tag is used for: during counting, subtracting the value of a counter thereof by 1 after receiving a Success command; and adding the value of a counter thereof by 1 after receiving a Fail command and converting the status thereof from ID status to Data_Exchange status; when receiving a Finish command, generating a response to the reader-writer if the status of the tag is ID status, and making no response to the reader-writer if the status of the tag is Data_Exchange status.

Figure 1:
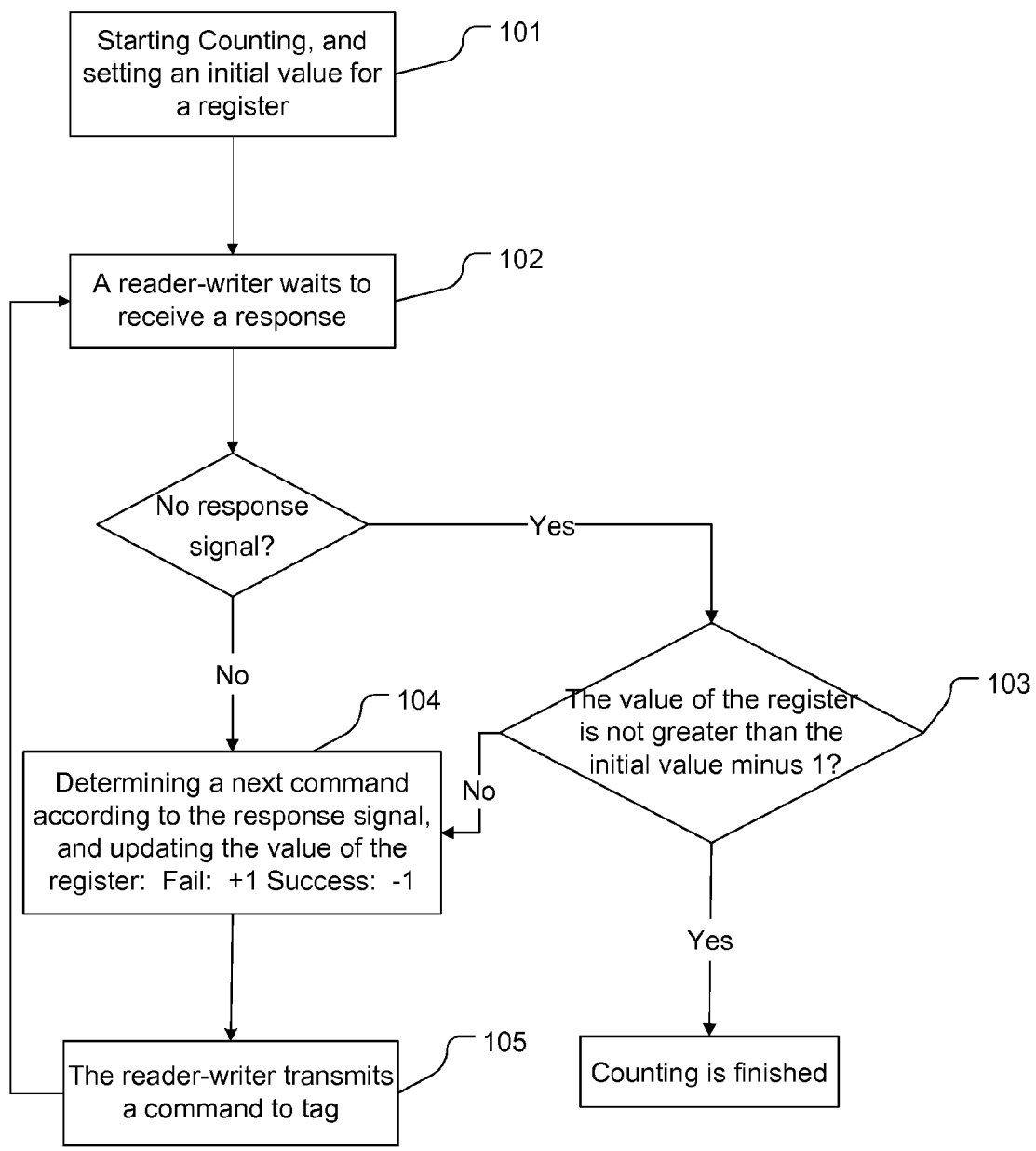
FIG. 1 is a flowchart of the current counting ending algorithm.
Figure 2:
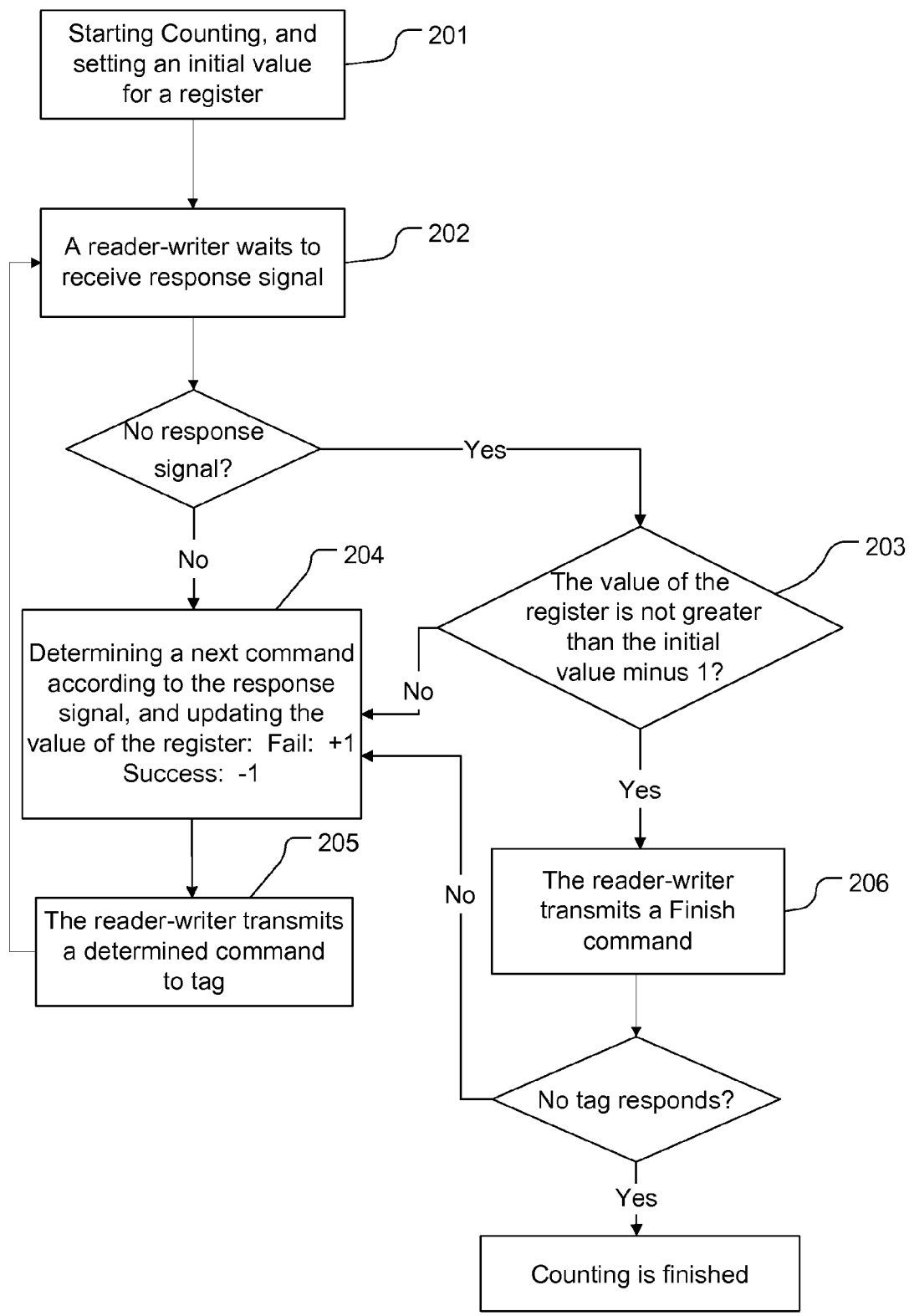
FIG. 2 is a flowchart of a counting ending algorithm according to the present invention.

Correspondingly, with reference to FIG. 2, the above-mentioned counting ending method for anti-collision in the radio frequency identification system comprises the following steps:

Step 201: after the counting begins, a register is set with an initial value.

Step 202: a reader-writer waits for response signals from a tag.

Step 203: if there is no response signal this time, then determine the value of the register, if the value of the register is less than or equal to the initial value of the register minus 1, it means that counting is finished and step 206 is to be executed; if the value of the register is greater than the initial value of the register minus 1, then it means that counting is not finished, step 204 is to be executed and the counting process is to be continued.

Step 204: a next command of the reader-writer is determined according to the response situation, meanwhile, the value of the register is updated according to the command, if the command is a Fail command, the value of the register is added by 1; if is the command is a Success command, the value of the register is subtracted by 1; the value of the register is not adjusted if the command is another command.

Step 205: transmitting commands to a tag, then returning to step 202, and continuing the counting process.

Step 206: The reader-writer transmits Finish commands and waits for response information from the tag, if there is no response, it means that there are no tags which are not counted in the communication filed and the counting process is finished; if there is any response which comprises two cases of normal response and collision, then a next command is determined by the reader-writer and return to step 204.

Figure 3:
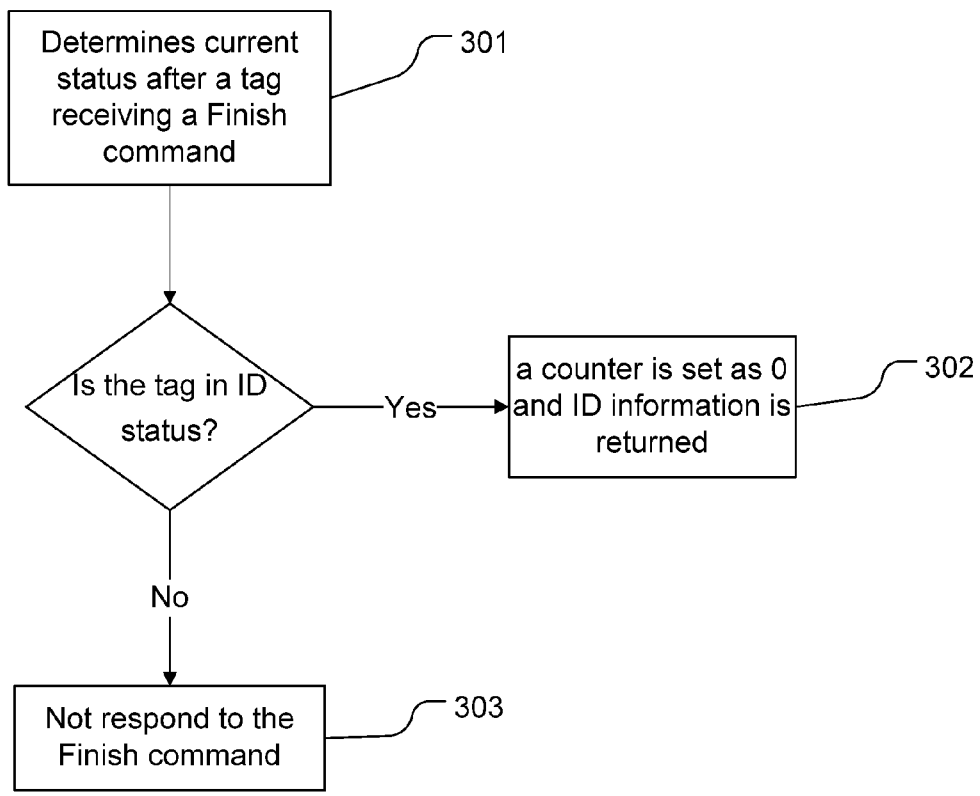
FIG. 3 is a processing flowchart after tags receive Finish commands according to the present invention.

With reference to FIG. 3, this figure shows a processing flowchart after the tags receive the Finish command in the above-mentioned method, which comprises:

Step 301: a tag determines the current status after receiving a Finish command.

Step 302: if the tag is in ID status, the counter of the tag is set as 0, and the identity ID information of the tag is responded to the reader-writer.

Step 303: if the tag is not in ID status, no response is performed by the tag.

The present invention will be further described below in details with reference to drawings and specific embodiments.

Figure 4:
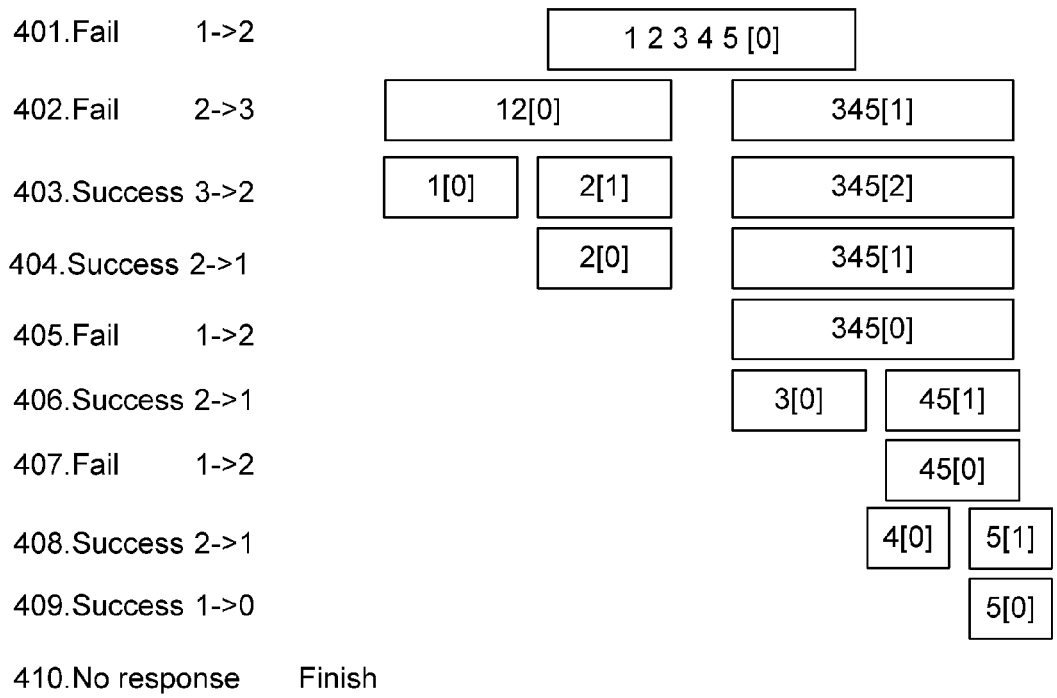
FIG. 4 is a schematic diagram of a tag counting process in theoretical situation.

In the embodiment, the initial value of the register is set to 1. FIG. 4 is a schematic diagram of a tag counting process in theoretical situation, command transmitted by the reader-writer each time and updated values of the register are listed on the left side in the Fig; a number on the right side in each tag frame represents a current value of a counter during counting. The simple description of the counting process is described as follows:

Step 401: performing initialization, counters of a tag are set as 0, and responding that collision occurs, Fail is sent, and the value of a register is added by 1 up to 2.

Step 402: for counter 00111, collision occurs, Fail is transmitted, and the value of the register is added by 1 up to 3.

Step 403: for counter 01222, after counting normally, Success is transmitted, and the value of the register is subtracted by 1 up to 2.

Step 404: for counter 0111, after counting normally, Success is transmitted, and is the value of the register is subtracted by 1 up to 1.

Step 405: for counter 000, collision occurs, Fail is transmitted, and the value of the register is added by 1 up to 2.

Step 406: for counter 011, after counting normally, Success is transmitted, and the value of the register is subtracted by 1 up to 1.

Step 407: for counter 00, collision occurs, Fail is transmitted, and the value of the register is added by 1 up to 2.

Step 408: for counter 01, after counting normally, Success is transmitted, and the value of the register is subtracted by 1 up to 1.

Step 409: for counter 0, after counting normally, Success is transmitted, and the value of the register is subtracted by 1 up to 0.

Step 410: There is no tag for counting, the value of the register is 0, and the counting process is finished.

Figure 5:
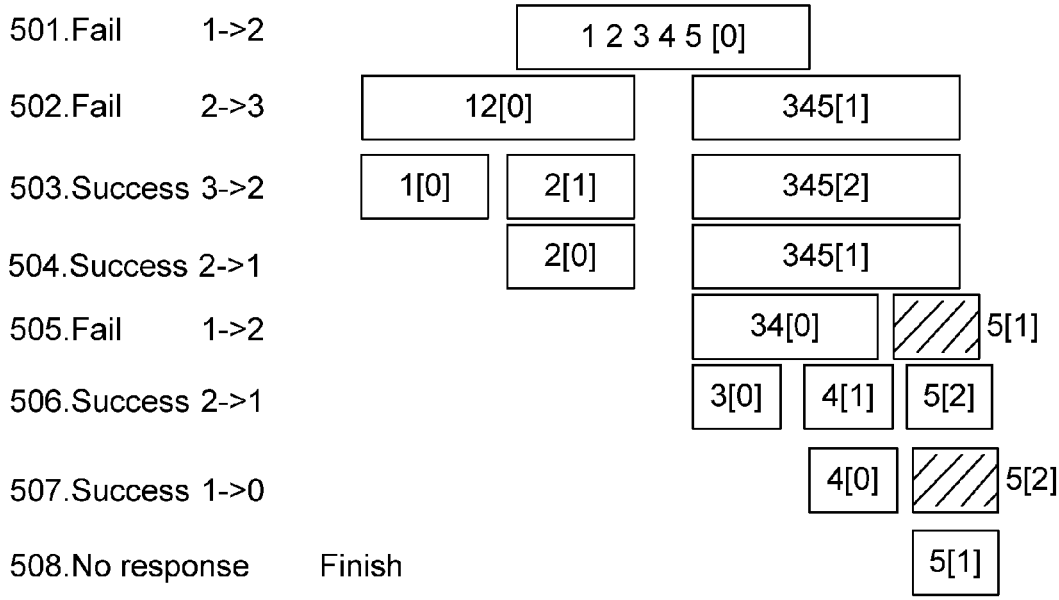
FIG. 5 is a schematic diagram of a tag counting process when tag omitting occurs.

FIG. 5 is a schematic diagram of the tag counting process when tag omitting occurs, wherein in step 504, the transmitted Success command is not normally received by tag 5, such that the counter of the tag 5 is not subtracted by 1. In this way, the subsequent flows change, and the Success command in step 506 is not normally received either, and the subsequent flows are as follows:

Step 505: for counter 001, collision occurs, Fail is transmitted, and the value of the register is added by 1 up to 2.

Step 506: for counter 012, after counting normally, Success is transmitted, and the value of the register is subtracted by 1 up to 1, at this time, tag 5 does not receive a Success command correctly.

Step 507: for counter 02, after counting normally, Success is transmitted, and the value of the register is subtracted by 1 up to 0.

Step 508: for counter 1, no tag respond, meanwhile the value of the register is 0, and the counting processed is finished. In this way, tag omitting is caused during counting process.

Figure 6:
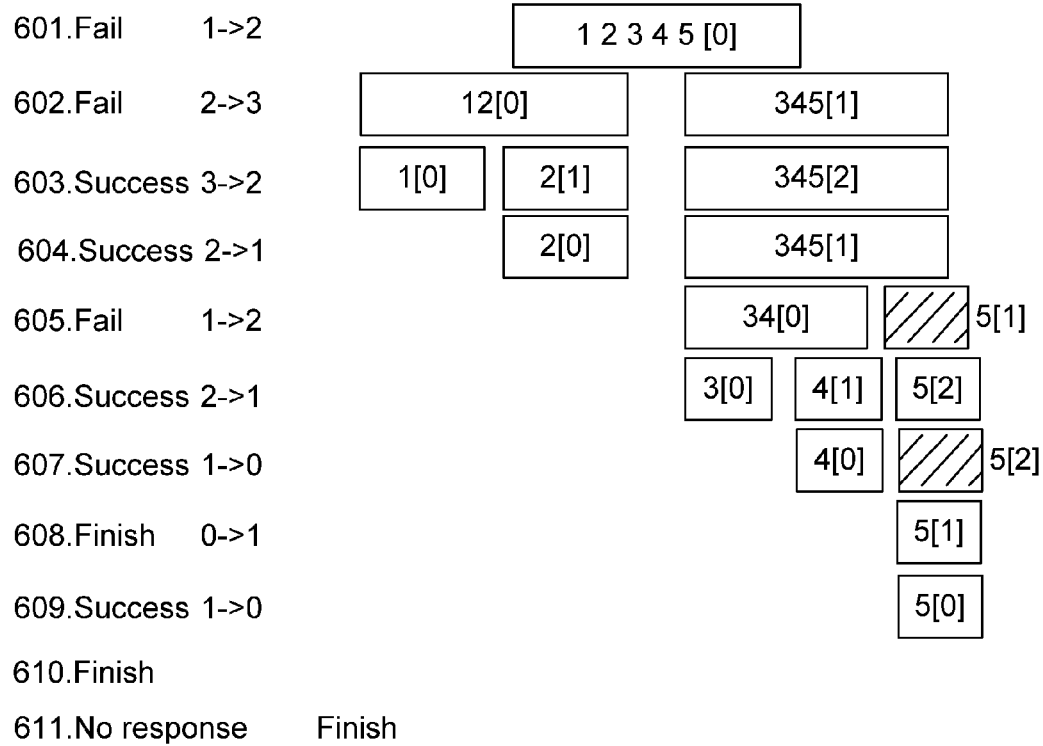
FIG. 6 is a schematic diagram of a counting process after the present invention is employed.

FIG. 6 is a schematic diagram of the counting process after the present invention is employed, step 601-step 607 are completely identical to step 501-step 507 in FIG. 5; is the subsequent steps are as follows:

Step 608: in this step, after the value of the register becomes 0, transmitting a Finish command and adding the value of the register by 1; at this time, tag 5 is still in ID status, the value of the counter is reduced to 0, and then the identity ID information of tag 5 is responded.

Step 609: the reader-writer receives normal response and transmits a Success command after counting normally, tag 5 is counted successfully, the status is converted to Data_Exchange status, and the value of the register of the reader-writer is subtracted by 1 up to 0.

Step 610: at this time, there is no signal response and the value of the register is 0, therefore a Finish command is transmitted again.

Step 611: no tag responds, the reader-writer does not receive corresponding signals, and the counting of this time is finished.

The above embodiment is only used for explaining but not intended to limit the technical solution of the present invention, and the present invention is only described in details with reference to the preferred embodiments. For common technicians in the field, it should be understood that modifications or equivalent replacements may be done for the technical solution of the present invention within the spirit and scope of the technical solution of the present invention, and those modifications or equivalent replacements should be comprised within the protection scope of the invention.

The invention claimed is:

1. A tag counting ending method for anti-collision in a radio frequency identification system, comprising:
transmitting a Finish command to each tag by a reader-writer and waiting for response when no response signal is received from tags and the value of a register is not greater than a pre-determined counting ending register threshold value;
judging whether a tag itself is counted successfully after the tag receives the Finish command, if so, making no response;
determining that counting is finished if the reader-writer does not receive a response signal.

2. The tag counting ending method for anti-collision according to claim 1, wherein the judging method is: if in ID status currently, then the tag determines that the tag itself is not counted successfully; if not in ID status currently, then the tag determines that the tag itself is counted successfully.

3. The tag counting ending method for anti-collision according to claim 1, further comprising:
setting a counter of a tag itself as 0 and transmitting a response signal to the reader-writer when the tag determines that the tag itself is not counted successfully.

4. The tag counting ending method for anti-collision according to claim 3, wherein after the tag receives a Finish command, the response signal is carrying an identity ID information of tag.

5. The tag counting ending method for anti-collision according to claim 3, further comprising:
the reader-writer receives the response signal, determines that counting is not finished, and continues to count the tag which makes response.

6. The tag counting ending method for anti-collision according to claim 1, wherein the counting ending register threshold value is an initial value of the register minus 1.

7. The tag counting ending method for anti-collision according to claim 2, further comprising:
setting a counter of a tag itself as 0 and transmitting a response signal to the reader-writer when the tag determines that the tag itself is not counted successfully.

8. The tag counting ending method for anti-collision according to claim 7, wherein after the tag receives a Finish command, the response signal is carrying an identity ID information of tag.

9. The tag counting ending method for anti-collision according to claim 7, further comprising:
the reader-writer receives the response signal, determines that counting is not finished, and continues to count the tag which makes response.

10. A radio frequency identification system, comprising a reader-writer and tags; the reader-writer comprising a register, and the tags comprising counters, wherein,
the reader-writer is used for, transmitting a Finish command to the tags and waiting for responses when no response signal is received from the tags and the value of the register is not greater than a pre-determined counting ending register threshold value, and determining that counting is finished in case that no response signal is received;
the tag is used for, judging whether the tag itself is counted successfully when receiving the Finish command, if so, making no response.

11. The radio frequency identification system according to claim 10, wherein the tag is further used for, converting current status from ID status to Data_Exchange status after the tag is counted successfully.

12. The radio frequency identification system according to claim 11, wherein the tag is further used for, setting a counter of the tag itself as 0 and transmitting a response signal to the reader-writer when the tag determines that the tag itself is not counted successfully.

13. The radio frequency identification system according to claim 12, wherein the reader-writer is further used for determining that counting is not finished when receiving a response signal and continuing to count the tag which makes response.

14. The radio frequency identification system according to claim 10, wherein the tag is further used for, setting a counter of the tag itself as 0 and transmitting a response signal to the reader-writer when the tag determines that the tag itself is not counted successfully.

15. The radio frequency identification system according to claim 14, wherein the reader-writer is further used for determining that counting is not finished when receiving a response signal and continuing to count the tag which makes response.

16. The radio frequency identification system according to claim 10, wherein the number of the tags is more than two.

* * * * *